May 6, 1969     W. D. WALTHER     3,442,533

FIFTH WHEEL COUPLER ASSEMBLY

Filed May 15, 1967     Sheet *1* of 3

INVENTOR.
WILLIAM DEAN WALTHER
BY *Hamilton & Cook*

ATTORNEYS

INVENTOR.
WILLIAM DEAN WALTHER
BY Hamilton & Cook
ATTORNEYS

United States Patent Office 3,442,533
Patented May 6, 1969

---

3,442,533
FIFTH WHEEL COUPLER ASSEMBLY
William Dean Walther, Dayton, Ohio, assignor to The Dayton Steel Foundry Company, Dayton, Ohio, a corporation of Ohio
Filed May 15, 1967, Ser. No. 638,473
Int. Cl. B62d *13/00*
U.S. Cl. 280—435          2 Claims

ABSTRACT OF THE DISCLOSURE

Fifth wheel coupler assembly carried by tractor to engage kingpin on trailer. During coupling a compression bar cooperating with a resilient bushing absorbs impact of coupling. Thereafter the compression bar engages the upper portion of the kingpin acting as shock absorber for to and fro, oscillatory, motion of the trailer to the tractor.

Background of the invention

Fifth wheels according to the invention were developed to improve upon prior art fifth wheels wherein the impact shock of coupling is transmitted to the trailer and cargo and/or tractor and driver. See, for example, the fifth wheel construction of U.S. Patent No. 3,013,815, issued Dec. 19, 1961, having a pair of opposed kingpin coupling jaws.

Prior art fifth wheels having a coupler assembly that absorbs the shock of coupling a kingpin thereto are disclosed in U.S. Patents No. 3,079,175 (Walther) and No. 3,251,610 (Chosy).

It has been found that a fifth wheel coupler assembly to effectively absorb the shock impact of coupling and also absorb the to and fro or oscillatory motion of the trailer to the tractor should provide a constant and uniform force acting rearwardly through the kingpin when confined by the coupling jaws or jaws. The force applied should serve to prevent the tractor driver from feeling the forward and aft, the to and fro or oscillatory, motion associated with the start and stop relative motion normally found in trailer operation.

In general, a coupler assembly according to the invention is used with a fifth wheel mounted on a tractor and having a top plate with a longitudinally directed kingpin slot opening to the rear. A coupler having one or more jaws is mounted beneath the top plate to rotate into the kingpin slot and engage the kingpin on a trailer. When the coupler is closed around a kingpin within the slot a latch mechanism carried beneath the top plate locks the coupler in a kingpin engaging position. When the coupler is locked around the kingpin, a compression bar pivotally mounted at one side of the slot and extending across the forward end of the slot contacts the kingpin. The movable end of the compression bar is rearwardly biased by a resilient compression or cushioning means carried beneath the top plate so as to maintain a uniform and constant force against the kingpin to reduce to and fro or oscillatory motion of the trailer relative to the tractor during over-the-road operation, the compression bar and resilient cushioning means also serving to reduce shock during coupling of the fifth wheel with the kingpin.

The invention further contemplates that when the coupler has bifurcated opposed coupling jaws, the latch mechanism will include a plunger block movable longitudinally of the kingpin slot and spring-biased so as to be inserted between opposed and parallel faces on the forward end of the dual coupling jaws locking the jaws closed without interfering with the functions of the compression bar.

Summary of the invention

Therefore, it is an object of the present invention to improve the operating characteristics of a fifth wheel on a tractor when coupled with the kingpin on a tractor.

Further, it is an object to improve the operating characteristics of a fifth wheel by elimination or substantial reduction of to and fro or oscillatory motion of the trailer to the tractor during over-the-road operation.

Still further, it is an object to reduce the shock impact of coupling the fifth wheel with the kingpin.

Still further, it is an object to provide an improved latch mechanism when the coupler of the fifth wheel has bifurcated opposed coupling jaws.

These and other objects which will become apparent from the following specification are accomplished by means hereinafter described and claimed.

The drawings

Description

Figure 1:
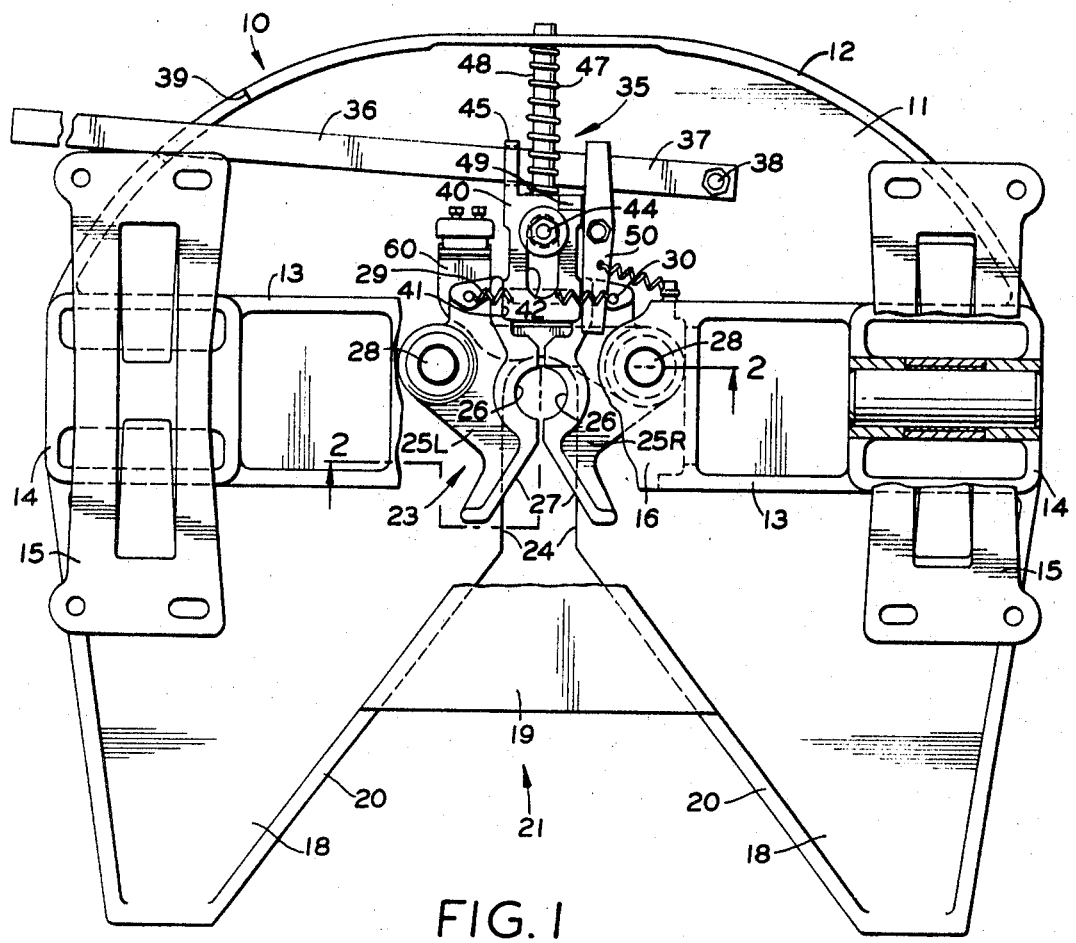
FIG. 1 is a bottom plan view of an improved fifth wheel according to the invention.
Figure 2:
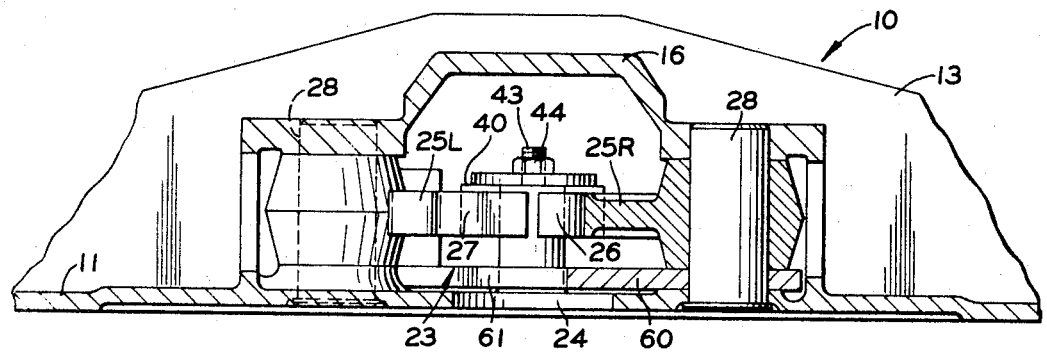
FIG. 2 is an enlarged cross-sectional view taken substantially as indicated on line 2—2 of FIG. 1.

In the drawings, the fifth wheel coupler assembly, represented generally by the numeral 10, is incorporated in a fifth wheel having a top plate 11 of conventional shape with a peripheral flange 12 and strengthening webs 13. The top plate is secured to the rear platform of a tractor (not shown) by a pair of depending bosses 14 pivotally connected to supporting brackets 15. In the area between brackets 15 and strengthening webs 13 the underside of the top plate 11 has a dependent underhousing 16 which protects and provides support for the several operating elements described below.

The rear portion of the top plate has rearwardly divergent leg portions 18, reinforced by a bottom web plate 19 forming a rearward extension of the underhousing 16, the inner edges 20 of which define the guide opening 21 adapted to guide a kingpin into engagement with the coupler indicated generally by the numeral 23.

The jaws of the kingpin coupler 23 are pivotally mounted within underhousing 16 so as to rotate horizontally into the longitudinally directed medial or kingpin slot 24 communicating with the guide opening 21. As shown, the kingpin coupler 23 has dual or bifurcated opposed coupling jaws 25L and 25R with complementary arcuate clamping surfaces 26 adapted to partially surround or engage the kingpin and rearwardly projecting cam edges 27. Each coupler jaw 25 pivots on a pin 28 extending between top plate 11 and underhousing 16 and is biased to rotate the cam edges 27 forwardly assuming the open position shown in FIG. 4 by a strong tension spring 29 connected between a depending pin 30 on the forward end of each coupler jaw.

Figure 6:
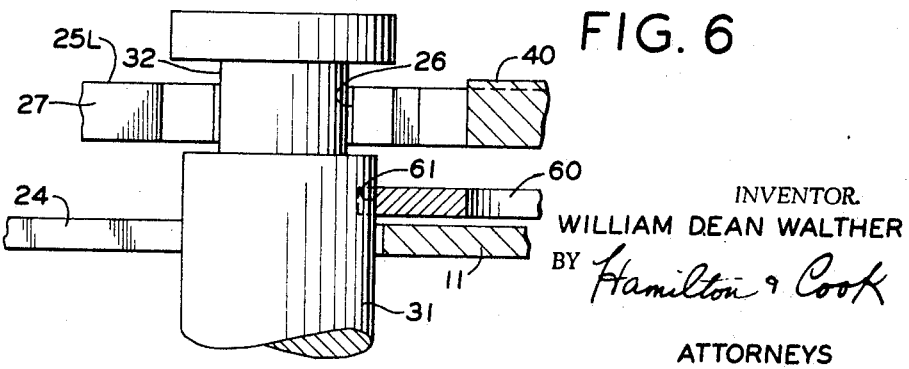
FIG. 6 is a sectional view taken substantially as indicated on line 6—6 of FIG. 5.

As best seen in FIG. 6, the kingpin 31 attached to the trailer (not shown) has a recessed intermediate or neck portion 32 closely surrounded or engaged by the clamping surfaces 26 of the coupler jaws when the coupler 23 is closed. The coupler 23 is maintained in the closed condition by a latch mechanism indicated generally by the numeral 35.

Referring to FIG. 1, the coupler latch mechanism 35 is carried beneath the top plate 11 and includes a lever 36 having an inner end 37 movably fastened as by a bolt and nut 38. The outer end of lever 36 extends through a slot 39 in the flange 12 to form a handle for actuating the latch mechanism.

Figure 3:
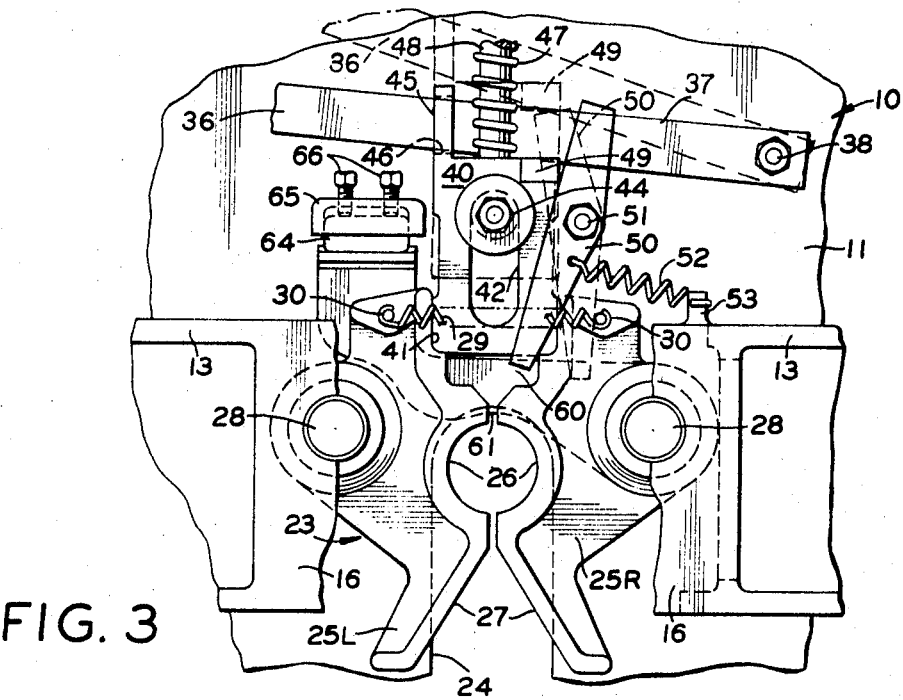
FIG. 3 is another bottom plan view similar to FIG. 1 but enlarged to show details of the fifth wheel when the coupler is closed.
Figure 4:
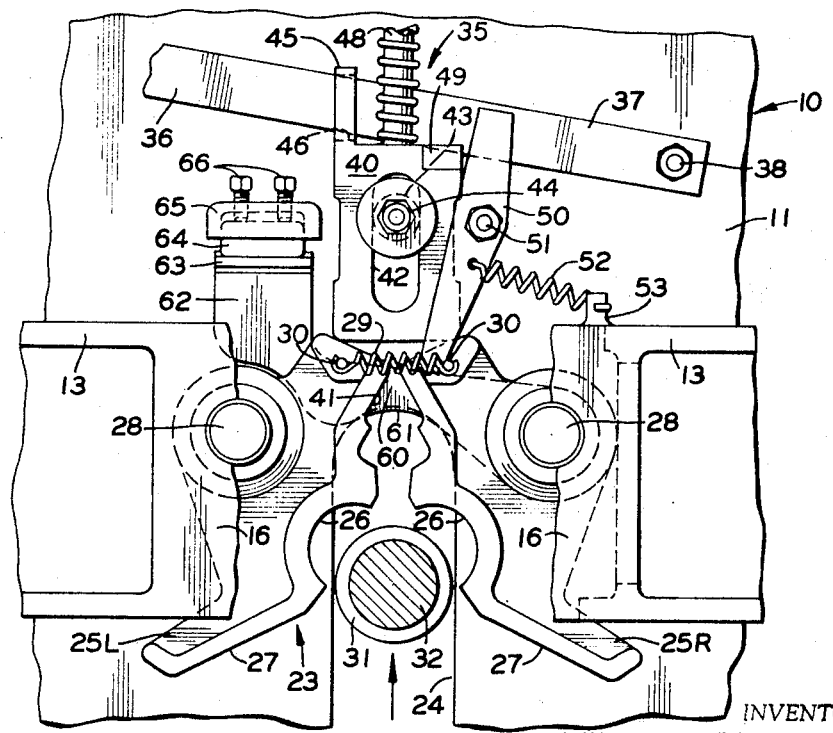
FIG. 4 is a view similar to FIG. 3 showing the coupler open to receive a vehicle kingpin.
Figure 5:
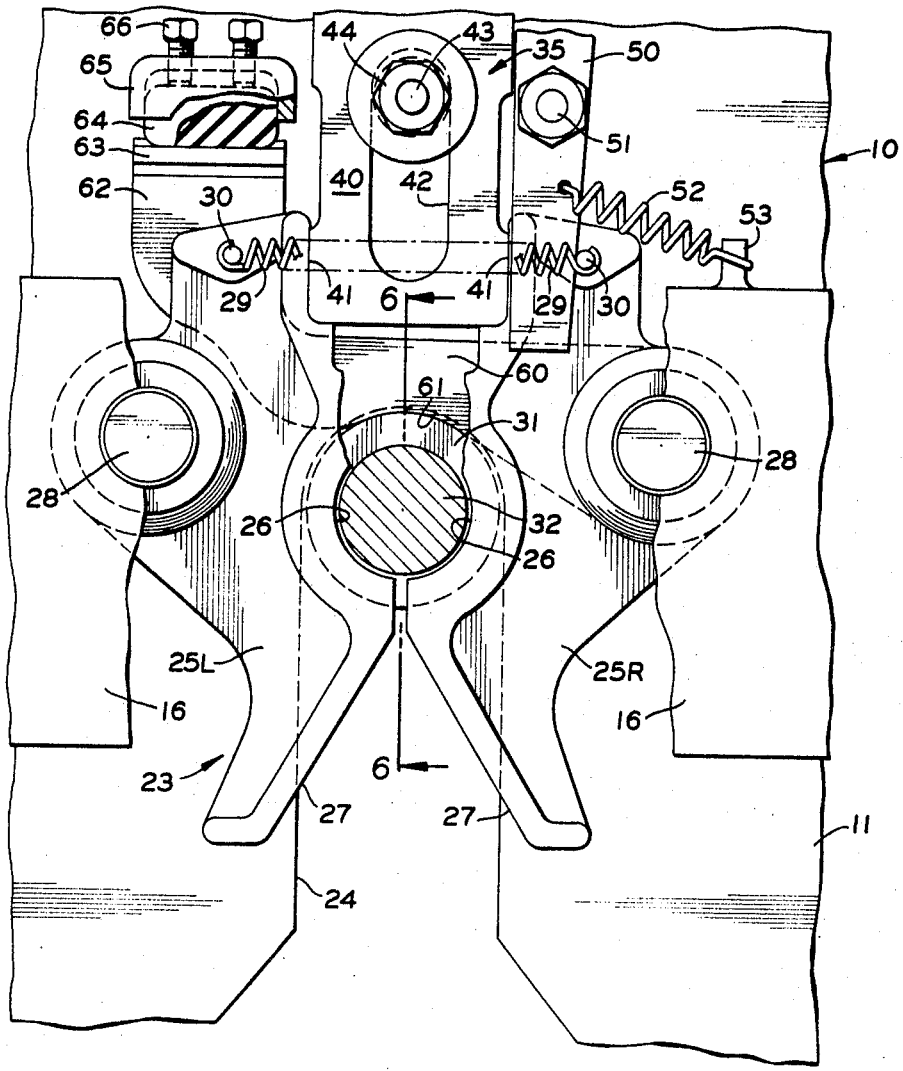
FIG. 5 is a view similar to FIG. 3, but further enlarged showing the coupler closed around a trailer kingpin.

Referring to FIGS. 3, 4 and 5, the coupler jaws 25 are locked in the closed position by a sliding plunger block 40 which moves between opposed parallel surfaces 41 on the forward end of each coupler jaw. The plunger block 40 has an elongated slot 42 enclosing a guide stud 43 (shown in dotted lines in FIG. 5) depending from the top plate 11 and securely fastened as by a lock nut and washer assembly 44. The plunger block 40 also has a forwardly extending ear flange 45 with a horizontal slot 46 for insertion of the medial portion of latch lever 36 therethrough. The plunger block 40 is normally biased toward the coupler jaws 25 by a strong compression spring 47 mounted around a plunger block rod 48 slidably mounted in a suitable bore in the flange 12. When the plunger block 40 is retracted by movement of the latch lever 36 (to the broken line position in FIG. 3), it is necessary that the plunger block be rendered inoperative or held out of contact with the coupler jaws 25 until the trailer is completely uncoupled from the fifth wheel. Accordingly, and in a conventional manner as shown in U.S. Patent No. 2,885,222, a cooperative lock or latch bar 50 is rotatably fastened to the top plate 11 by a bolt, lock nut and washer assembly 51. The forward end of the latch bar 50 is squared so as to engage a latch dog 49 extending downwardly from the forward portion of the plunger block 40 when the plunger block 40 is retracted. The inner end of the latch bar 50 is preferably tapered, so as to slidingly engage a suitable mating surface on the under side of coupling jaw 25R, such as the pin 30. A tension spring 52 is connected between a flange 53 on the under housing 16 and the midpoint of latch bar 50 so as to cause the end of the latch bar 50 to always be tending to rotate into engagement with the latch dog 49.

The primary object of the invention, the elimination of to and fro or oscillatory motion of the trailer to the tractor during over-the-road operation, is achieved by a compression bar 60 pivotally mounted on the pin 28 mounting coupling jaw 25R and extending across the forward end of the kingpin slot 24. The trailing surface or edge of the medial portion of the compression bar 60 is arcuately curved, as at 61, to engage the upper or main body portion of the kingpin 31 (see FIG. 6).

The movable end of the compression bar 60 includes a forwardly directed portion 62 terminating in a vertical plate 63 adapted for extensive surface contact, face-to-face, with a resilient cushioning member 64. The compression member 64 may be a rubber block as is securely confined within a housing 65 depending from the top plate 11. The forward side of the compression member housing 65 is preferably provided with adjusting means such as the bolts 66 to adjust the degree of compression in the rubber block 64 and thereby compensate for varying trailer loads or routine wear of the various components of the fifth wheel.

Although the compression bar 60 has been shown in a coupler assembly 10 having dual opposed coupling jaws, it is apparent that the principles of the compression bar 60 as disclosed herein could be used in a fifth wheel coupler assembly having a one-piece coupler jaw. Another modification would be to use a coiled compression spring as the resilient cushioning member 64 in place of a rubber block.

I claim:
1. A coupler assembly for a fifth wheel mounted on a tractor and having a top plate with a longitudinally directed kingpin slot, a coupler mounted beneath said top plate to rotate into the kingpin slot and engage the kingpin on a trailer, and a latch mechanism carried beneath said top plate to lock the coupler in a kingpin engaging position, characterized in that said coupler has dual opposed coupling jaws pivoting on pins beneath said top plate, and a compression bar pivotally mounted on one of said pins at one side of said slot extends across the forward end of said slot and contacts said kingpin, the movable end of said compression bar being rearwardly biased by a resilient cushioning means carried beneath said top plate so as to maintain a uniform or constant force against the kingpin to reduce to and fro or oscillatory motion of the trailer relative to the tractor during over-the-road operation.

2. A coupler assembly according to claim 1 wherein said latch mechanism includes a plunger block movable longitudinally of the kingpin slot and spring-biased so as to be inserted between opposed and parallel faces on the forward end of the dual coupling jaws locking the jaws closed.

References Cited

UNITED STATES PATENTS

| | | | |
|---|---|---|---|
| 2,423,743 | 7/1947 | Walther et al. | 280—434 |
| 3,079,175 | 2/1963 | Walther | 280—434 |
| 3,251,609 | 5/1966 | Daniels | 280—434 |
| 2,251,610 | 5/1966 | Chosy | 280—435 |

LEO FRIAGLIA, *Primary Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,442,533                                           May 6, 1969

William Dean Walther

It is certified that error appears in the above identified patent and that said Letters Patent are hereby corrected as shown below:

Column 1, line 37, "jaws", first occurrence, should read -- jaw --. Column 4, line 47, "2,251,610" should read -- 3,251,610 --.

Signed and sealed this 1st day of September 1970.

(SEAL)
Attest:

Edward M. Fletcher, Jr.                         WILLIAM E. SCHUYLER, JR.
Attesting Officer                                     Commissioner of Patents